United States Patent

Artinger

[11] Patent Number: 5,929,634
[45] Date of Patent: Jul. 27, 1999

[54] DEVICE FOR SENSING METALLICALLY CONDUCTIVE PARTS IN AN AT LEAST SUBSTANTIALLY NON-CONDUCTIVE CONVEYOR STREAM

[75] Inventor: Manfred Artinger, Schonberg, Germany

[73] Assignee: Firma Mesutronic Geratebau GmbH, Kirchberg/Wald, Germany

[21] Appl. No.: 08/660,569

[22] Filed: Jun. 7, 1996

[30] Foreign Application Priority Data

Jun. 10, 1995 [DE] Germany ............................. 19521266

[51] Int. Cl.⁶ ............................. G01V 3/10; G01N 27/72
[52] U.S. Cl. ............................................. 324/233; 324/326
[58] Field of Search ................................ 324/233–236, 324/239, 326–327, 234, 235, 260; 340/676; 327/2–8

[56] References Cited

U.S. PATENT DOCUMENTS

| | | | |
|---|---|---|---|
| 4,700,139 | 10/1987 | Podhrasky | 324/329 |
| 4,868,910 | 9/1989 | Maulding | 324/233 |
| 5,315,243 | 5/1994 | Kempster et al. | 324/233 |
| 5,426,362 | 6/1995 | Ninnis | 324/235 |

FOREIGN PATENT DOCUMENTS

| | | |
|---|---|---|
| 28 37 265 | 3/1980 | Germany . |
| 32 28 447 | 2/1984 | Germany . |
| 36 28 219 | 2/1988 | Germany . |
| 37 14 009 | 11/1988 | Germany . |
| 40 17 780 | 12/1991 | Germany . |

OTHER PUBLICATIONS

Julian Wilburn, "Detecting Metal Particles", Automation, Dec. 1965, pp. 82–88.
Charles Brister, "Factors to Consider When Selecting Metal Detector Systems", Automation, Feb. 1967, pp. 69–73.
H. Abbas et al., "The Detection and Location of Foreign Metal Objects in Conveyed Products", Transactions of the Institute of Measurement and Control, vol. 8, No. 2, Apr.–Jun. 1986.

Primary Examiner—Jay M. Patidar
Attorney, Agent, or Firm—Kenyon & Kenyon

[57] ABSTRACT

A device is provided for generating a detection signal upon occurrence of metallically conductive parts in an at least substantially non-conductive conveyor stream in which device an electromagnetic alternating field is established by an alternating current generator via a transmitting coil system in a section of the conveyor stream to be monitored, the amplitude and phase variations of the alternating field triggered when a part passes being detected by a receiving coil system and a subsequent evaluation circuit in the form of a phase variation signal and an amplitude variation signal. A stage for vectorial addition of the two variation signals and a phase comparator are provided. On the one hand, the vectorial composite signal is fed to the phase comparator, and on the other hand, one of the two variation signals is fed to the phase comparator. The output signal (phase angle signal) corresponds to the phase angle between the vectorial composite signal and one of the two variation signals. The phase angle signal is supplied via an evaluation stage that converts it into a control signal evaluated in a material-specific manner, which control signal controls an adjustable output stage that emits a material-specific detection signal for a part to be detected which is located in the conveyor stream.

11 Claims, 5 Drawing Sheets

DEVICE FOR SENSING METALLICALLY CONDUCTIVE PARTS IN AN AT LEAST SUBSTANTIALLY NON-CONDUCTIVE CONVEYOR STREAM

FIELD OF THE INVENTION

The present invention relates to a device for generating a detection signal upon occurrence of metallically conductive parts in an at least substantially non-conductive conveyor stream.

BACKGROUND INFORMATION

German Patent Application Nos. 37 14 009 and 40 371 780 describe devices that detect metallically conductive parts in a substantially non-conductive conveyor stream. These devices needed, for example, for sensing metal parts in a conveyor stream consisting mainly only of paper or recyclable plastic, the conveyor stream being fed to a shredder for reprocessing. These devices are also used in pneumatic conveyor systems for granular materials made of plastic and in the tobacco and textile industries as well as in the foodstuffs industry. If solid metal parts are contained, namely, in the conveyed material, this can lead to disruptions in the work procedure or even to the destruction of machine parts although the parts might be very small. Likewise, in textile goods, metal parts and wire residue from brushing machines are disruptive for obvious reasons. On the other hand, foil-like conductive parts, such as the covers on goods packaged in plastic containers, are also a common occurrence and are generally not to be sorted out since they either serve as packaging or their mechanical resistive force is very low such that they pose no risk to subsequent machinery.

Here, the detection signal is intended to actuate protective devices, such as optical and/or acoustic signalling means, or interrupting devices for the conveyor device, or even to divert the conveyor stream containing a disruptive part into a gathering container or the like.

The devices mostly work in a manner such that an electromagnetic alternating field is established by an alternating current generator via a transmitting coil system in a section of the conveyor stream to be monitored, the amplitude and phase variation of the alternating field triggered when a part passes being detected by a receiving coil system and a subsequent evaluation circuit in the form of a phase variation signal and an amplitude variation signal, which are used to derive the detection signal. In order to be able to detect small, solid and metallically conductive parts even more reliably, in conventional devices the fact is exploited that the influence of conductive parts increases with the frequency of the electromagnetic alternating field. The conventional systems operate for this reason at relatively high frequencies of at least 16 kHz. In most cases, the frequency is considerably higher. However, the associated increase in sensitivity means that parts that are not to be sorted out per se, such as foil-like parts, trigger detection signals and depending on the type of protective means provided for the conveyor system, either shut it down, for example, or undesirably divert the conveyor stream. Nonetheless, the detection of small, solid, metallically conductive parts still frequently entails certain difficulties since the signal amplitude caused by small parts is low with respect to that of foil-like, metallically conductive parts. The state of the art is also described in general in the publication "Detecting metal particles in nonmetallic materials" in the journal "Automation", December 1965, pp. 83–87. Such measurement techniques and devices are also used to distinguish between metal types and to detect certain metallic objects, as shown by, for example, the DE-PS 28 37 265 and the DE-PS 32 28 447. According to the DE-PS 28 37 265, in order to identify conductive objects, the effective resistance component normalized to the operating frequency is measured at several frequencies and a conclusion regarding the material type is made based upon this. However, a precise investigation based on this method results in not only a high expense, but is also relatively difficult since comparison values must be retained in a memory for each material type depending on the respective object or part that is sought after. On the other hand, the solution approach described in the DE-PS 32 28 447 uses the known material-dependent phase shift between the transmitted and the received alternating field when a disruptive part passes as a criterion for the material type, but as before, there are difficulties in reliably detecting, most particularly, small but nonetheless disruptive parts.

SUMMARY

The underlying object of the present invention is to counter these difficulties, most particularly, to also reliably detect small, metallically conductive, solid parts, and not only as such, but also with regard to their material type.

Based on a device for generating a detection signal upon occurrence of metallically conductive parts in an at least substantially non-conductive conveyor stream in which device an electromagnetic alternating field is established by an alternating current generator via a transmitting coil system in a section of the conveyor stream to be monitored, the amplitude and phase variations of the alternating field triggered when a part passes being detected by a receiving coil system and a subsequent evaluation circuit in the form of a phase variation signal and an amplitude variation signal, which are used to derive a material-specific detection signal, this is achieved according to the invention in that a stage for vectorial addition of the two variation signals is provided, that a phase comparator is provided to which on the one hand the vectorial composite signal is fed and on the other hand one of the two variation signals is fed and whose output signal (phase angle signal) corresponds to the phase angle between the vectorial composite signal and one of the two variation signals, that an evaluation stage for the phase angle signal is connected to the phase comparator which evaluation stage derives from this a control signal evaluated in a material-specific manner, and that an adjustable output stage is connected to the stage for vectorial addition, which output stage receives the control signal as an adjustment signal and whose output signal serves as a material-specific detection signal for a part to be detected which is located in the conveyor stream.

It is useful to design the evaluation stage such that it changes the control signal inversely in comparison to the material to be detected in the amplitude ranges of the phase signal associated with other materials. Here, it is advantageous if the evaluation stage is designed such that for a material to be detected, the control signal leaves the amplitude value of the output signal largely unchanged, whereas the amplitude value of the output signal is decreased for other materials. It is also possible to boost the amplitude value of the output signal for a material to be detected using the control signal with respect to the values for other materials in an extent which is adapted to each individual case.

The evaluation circuit can be designed advantageously as a threshold circuit that changes the control signal inversely in comparison to the material to be detected in the amplitude ranges of the phase signal associated with other materials. In this sense, the evaluation circuit can also be an amplitude comparator having a comparison voltage that is preferably selectable in amplitude, which amplitude comparator emits a signal upon agreement.

It is particularly advantageous if in each case an analog/digital converter is connected to the evaluation circuit for the derivation of both variation signals, which analog/digital converter converts the variation signals into digital form, and if at least the stage for vectorial addition and the phase comparator are designed as circuits that operate digitally. However, it is also recommended to design the evaluation stage as a circuit that operates digitally. It is advantageous for this purpose if the output stage is designed as a multiplier that receives the vectorial composite signal as a multiplicand and the control signal as a multiplier. It is useful to connect in each case an analog/digital converter to the evaluation circuit for the derivation of both variation signals, which convert the variation signals into digital form, and it is also useful to design the stage for vectorial addition and the phase comparator as circuits that operate digitally. These specific embodiments make it possible to provide in an advantageous manner a memory for the storage of control signal values for specified materials. The material-specific read-out of the memory can then be carried out using the phase signal. Here, it is possible to advantageously associate an input apparatus with the memory for storing control signal values for specified materials in its memory cells.

The device according to the present invention is also advantageously suited to the generation of an actuation signal for the protection and separation apparatuses mentioned in the introduction. It can be achieved in this manner that additionally an actuation stage emitting an actuation signal is provided, which actuation stage receives as an input signal the vectorial composite signal changed by the control signal, and that the actuation stage contains a threshold circuit having a preferably adjustable threshold that is designed such that at the output of the actuation stage an actuation signal is emitted only when the threshold is exceeded by the changed vectorial composite signal. Here, it is useful to provide an apparatus for manually setting the threshold in the threshold circuit.

As was already mentioned, the measured phase angle is characteristic of the material. In other words, if the response sensitivity is significantly reduced or even set to zero for phase angles of a non-disruptive part such as aluminum foil while leaving the response sensitivity alone for other materials such as VA steel, then the device clearly responds—as investigations have shown—for example to a small nut of metric nut size M 3 consisting of VA steel, whereas even a clump of aluminum foil the size of a tennis ball does not trigger any reaction.

The invention is explained hereafter in greater detail based on exemplary embodiments represented in a drawing. The following are shown.

BRIEF DESCRIPTION OF THE DRAWINGS

DETAILED DESCRIPTION

Figure 1:
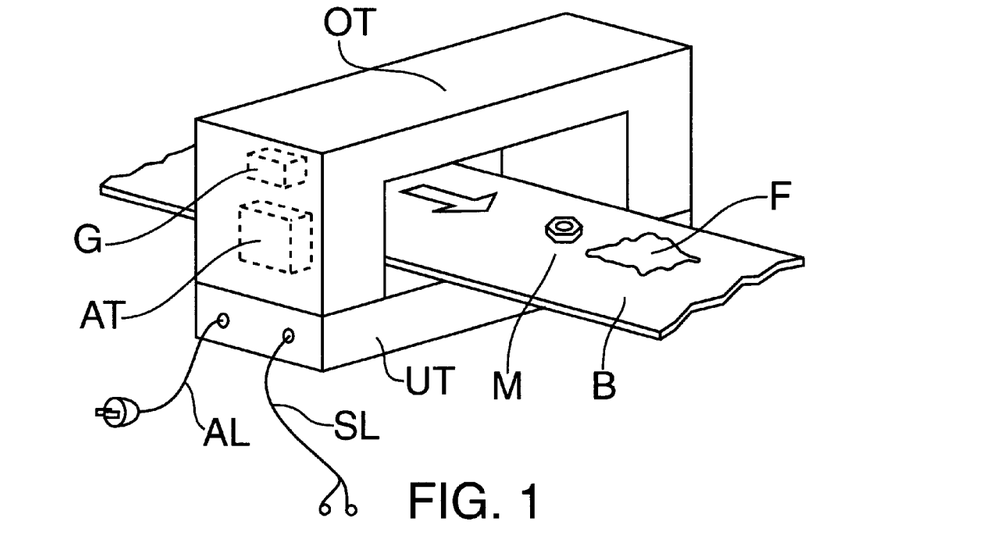
FIG. 1 shows a view of a metal detection device that encloses a conveyor belt.
Figure 2:
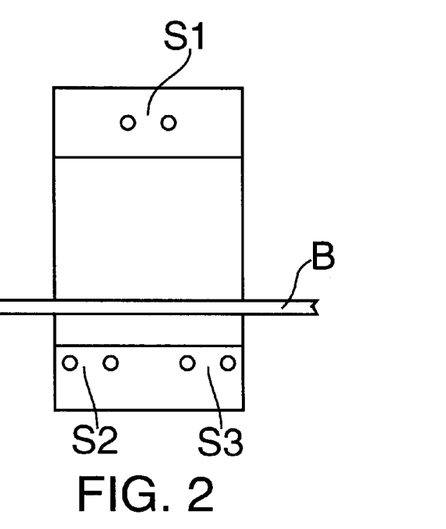
FIG. 2 shows section through a metal detection device according to FIG. 1.
Figure 3:
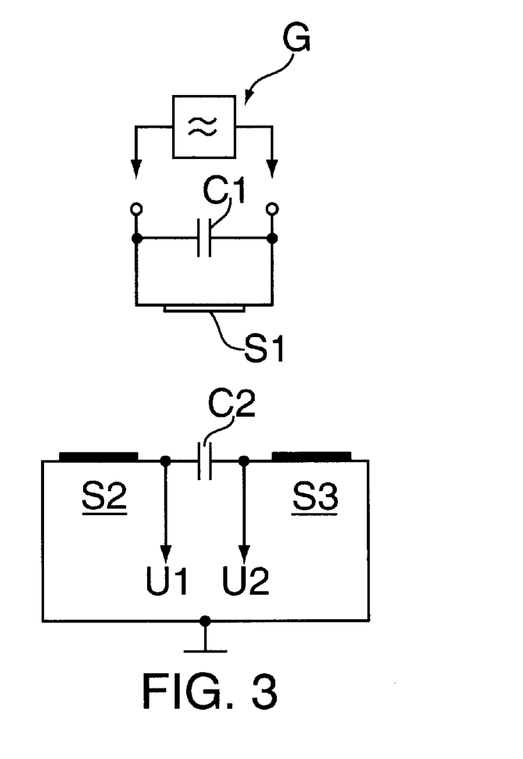
FIG. 3 shows circuit diagram with the transmitting coil for the generation of the electromagnetic alternating field in a specified spatial area and a coil system comprising two coils for receiving the alternating field.

The device shown schematically in FIGS. 1, 2 and 3 consists of two parts OT and UT, of which one is U-shaped and the other is designed as a flat support. These two parts enclose a conveyor belt B that transports the material to be inspected for undesired metallic parts through the device in the direction of the arrow shown. In the part OT, a transmitting coil S1 is arranged. In the part OT, moreover, a generator G supplying the transmitting coil with alternating current and a circuit A for deriving a detection signal from metallically conductive parts contained in the conveyor material are arranged. In the support UT, two receiving coils S2 and S3, displaced in the direction of conveyance, are arranged. The specific embodiment and arrangement of the coils, like the form of the housing and the form and type of the passage opening, are adapted in a conventional manner. Via contacts not shown in greater detail, their connections are fed to the circuit AT in the part OT. A connecting line AL serves to connect the device with the operating power supply. An output line SL serves to forward a detection signal to one of the protective apparatuses mentioned in the introduction.

It can be deduced from the circuit shown in FIG. 3 that the transmitting coil S1 is complemented by a capacitor C1 and the coil pair S2, S3 by a capacitor C2 in each case to form an electrical resonant circuit. The two resonant circuits S1,C1 or rather S2,S3,C2 are tuned so that they form a band-pass filter tuned to the frequency of the alternating current, which is supplied by the generator G. By dividing the coil and thus the inductance in the resonant circuit S2,S3,C2 it is possible to tap off two signals U1 and U2 in phase opposition with respect to the phase potential and feed them to the circuit A. It should be mentioned that the signals U1 and U2 do not have to be absolutely equally large, which would require great balance of the two receiving coils. In the case of a minor unbalance, only one of these two signals becomes somewhat larger; the ability to evaluate the two variation signals that occur when a part passes remains unchanged.

Figure 4:
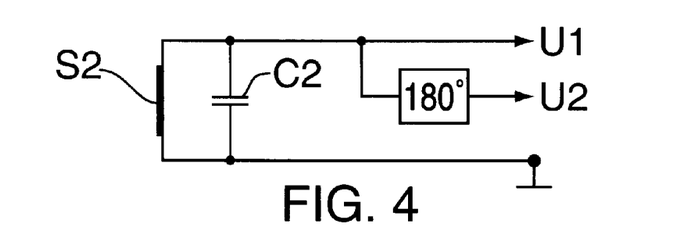
FIG. 4 shows a derivation of the signal U1 and U2 in only one receiving coil.

The device according to FIG. 1 uses on the secondary side a coil system consisting of two coils. It is also possible to work with only a single coil. In this case, as shown in FIG. 4, the signal U1 is to be tapped off on the resonant circuit and to be fed along with the signal Use of the generator G to the two inputs of the operational amplifier OP for subtraction. If, for circuit-engineering-related reasons such as the type of the operational amplifier, it is necessary in the individual case for the voltage tapped off of the individual coil to have an opposing phase relation, then it is recommended, as indicated in FIG. 4, to derive a signal Uz phase-shifted by 180° via a phase reversal stage PU in a conventional manner from U1 and feed this signal to the operational amplifier OP instead of U1.

Figure 5:
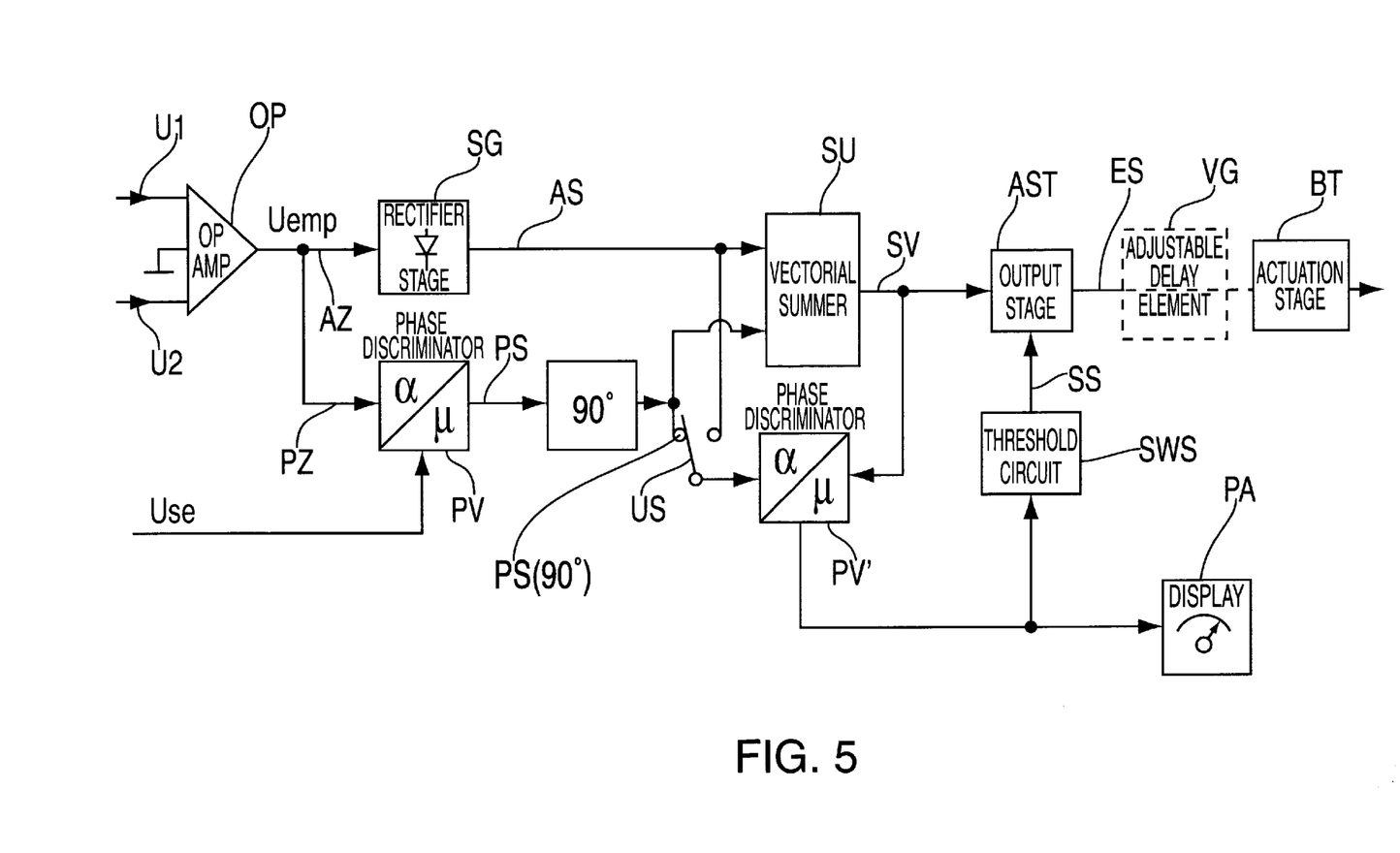
FIG. 5 shows a block diagram of a circuit for deriving the amplitude variation signal AS and the phase variation signal PS when a part to be found passes in the conveyor stream and their further processing into the detection signal ES.

The circuit AT begins, as shown in FIG. 5, with a difference amplifier OP formed by a so-called operational amplifier, at whose output a division into an amplitude branch AZ and a phase branch PZ is made. In the amplitude branch AZ, the magnitude value of the signal Uemp is determined using a rectifier stage SG, which magnitude value represents the amplitude variation signal AS. In the phase branch PZ, a phase discriminator PV is inserted that receives as a phase reference signal the signal Use of the generator G. The phase variation signal PS is present at the output of PV.

Figure 6:
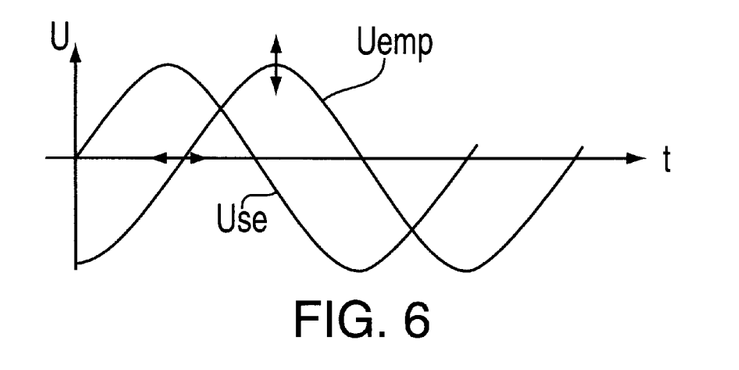
FIG. 6 shows an oscillation diagram for illustrating the effect of conductive parts in the conveyor material stream on the signal picked up via the coil system.

In FIG. 6, the influence of the passage of a metallically conductive part that is moved past the coil S2 by the conveyor belt is shown schematically. The eddy currents caused by the alternating field Use of the coil S1 in the part change both the amplitude as well as the phase relation of the signal Uemp received via S2 and S3, which signal is phase-shifted by 90° with respect to Use without such field interference. The ranges of variation are indicated with arrows.

Figure 7:
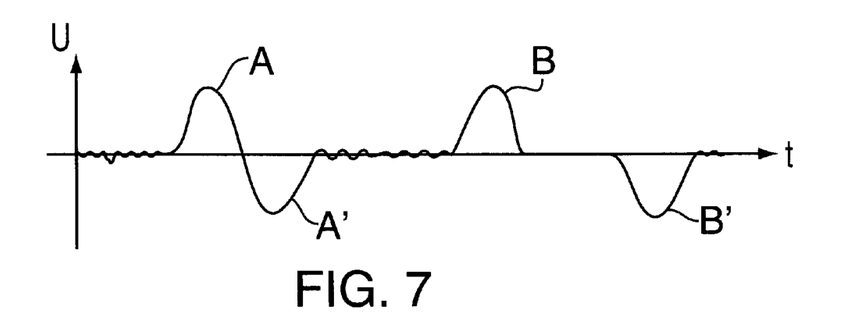
FIG. 7 shows behavior vs. time of the signal Uemp occurring during passage of a metallically conductive part.

In FIG. 7, the curve of the amplitude variation signal AS is reproduced in two cases. If the part is short with respect to the spacing of the coils S2 and S3, then a signal arises for each passing of one of the two coils, as is designated in FIG. 7 with A, A'. On the other hand, if the part is long, then the curve of AS is more or less like that shown by B, B'. The curve of the phase variation signal PS is analogous.

Figure 8:
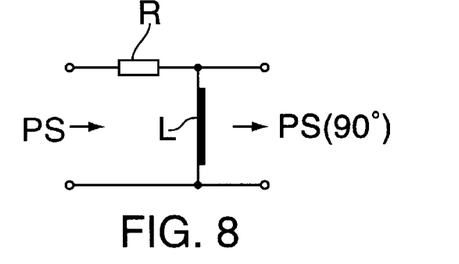
FIG. 8 shows possibility for the 90° phase shifting of PS.

A further processing step consists of vectorially adding AS and PS. For this purpose, a 90° phase shift between AS and PS is introduced, for example, in that, as is shown in FIG. 5, a 90° phase shifter is inserted into the line branch of PS. This can consist, for example, as is shown schematically in FIG. 8, of a resistance/inductance combination in a conventional manner in which the phase-shifted signal is tapped off of the inductance. The changeover switch US indicates that instead of PS(90°), AS can also be used for the vectorial addition.

Figure 9:
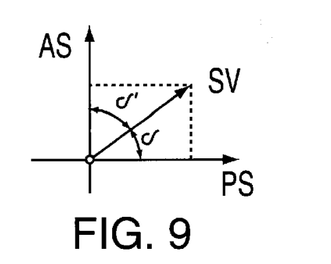
FIG. 9 shows vectorial relationship of AS, PS and VS.

The signals AS and PS(90°) that are mutually phase-shifted by 90° are put together in an adder SU to the vectorial composite signal SV. This has a phase angle α or rather α' with respect to the variation signals that is dependent on the material in the conveyor stream. The magnitude of the composite vector VS is at the same time a criterion for the material quantity of the part to be determined.

The phase angle α is obtained in the exemplary embodiment in that PS(90°) and SV are fed to a phase discriminator PV', which converts a d.c. signal corresponding to the phase difference whose amplitude reproduces the phase difference, which can be measured, for example, in a display instrument PA and thus displayed. However, in the exemplary embodiment, this signal is used additionally to control an output stage AST that generates the actual detection signal ES.

Since the signal received from PV' is dependent with its amplitude only on the phase angle α or rather α', the amplitude can be used as an assessment for the material of the part to be determined. Different materials thus yield different amplitude values. Using a threshold circuit SWS, for certain phase angles α or rather α', the control signal SS coming from PV' can be influenced in an angle-specific manner in the amplitude and can thus be used for the angle-specific or rather material-specific control of AST. For this purpose, SWS can be designed as a threshold circuit having an upper and a lower threshold that only allows such signals to pass that lie in terms of their amplitude between the two amplitude threshold values. By setting the two amplitude thresholds, a desired angle range and thus a certain material range can be chosen.

In the output stage AST, the signal received from SWS is used so that the signal SV fed to it can pass only for the certain phase angle range, whereas for materials to be classified outside of the angle range, an attenuation or even a complete suppression occurs. For example, this can be realized in a simple manner in that the output stage AST is an attenuation regulator controllable by the signal from SWS, which attenuation regulator is regulated by the signal fed to it. The signal then serves in a conventional manner to reset an actuation stage BT for activating one of the protection or indication apparatuses mentioned in the introduction. Using an interconnected delay element VG, any possible delay inaccuracies between the passing of the coil system by a part to be sensed and the protection or indication apparatus can be compensated.

It is also possible to design the threshold circuit so that it influences the control signal in an reducing or suppressing manner only for such signal amplitudes that correspond to the phase angle range of the material to be detected. This can take place through a stage connected after SWS, which stage is closed by control signals corresponding to the material to be detected, i.e., no longer emits a signal and opens for control signals associated with other materials so that the control signal can pass. In this case, AST is to be adjusted inversely to the previously covered case. In this case as well, ES is thus a function of the material-specific control signal SS and the amplitude of SV.

If necessary, the detection signal ES can be used via a further threshold circuit, that only signal values exceeding a required amplitude value and/or an adjustable attenuation regulator with a threshold circuit connected afterwards for controlling the protective devices mentioned in the introduction as an actuation signal. In this manner, the response sensitivity, so to speak, can be adjusted, the reason being that very small parts made of a so-called critical material do not necessarily have to be separated in some cases.

Figure 10:
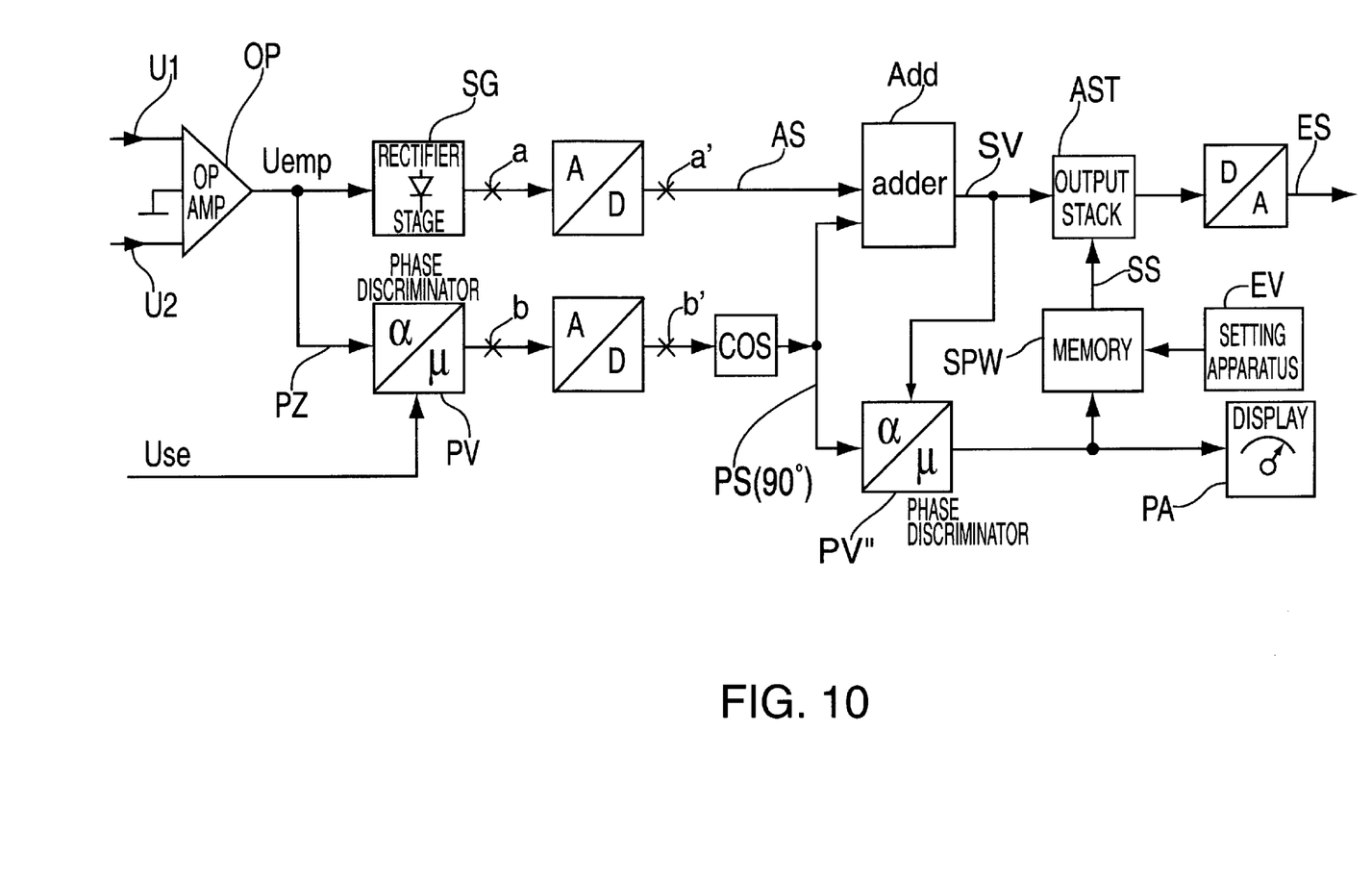
FIG. 10 shows circuit-engineering-based possibility for the evaluation of AS and PS using digital technology.
Figure 11:
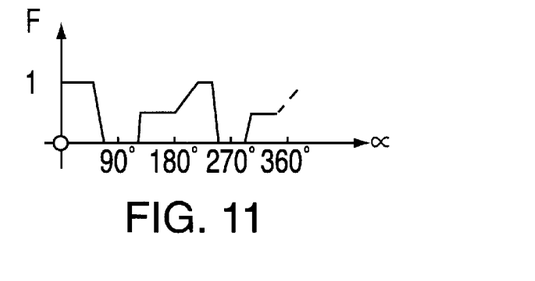
FIG. 11 a diagram for a material factor curve.

In FIG. 10, a circuit corresponding to FIG. 5 is shown that works largely on a digital basis. For this purpose, the output signals of SG and PV are converted via analog/digital converters A/D into digital signals, for example, in a 16-bit code, as is used in conventional computers. The 90° phase shift can then be obtained using the cosinusoidal conversion unit known, for example, from pocket calculators. The digital signals corresponding to the signals AS and PS(90°) are then geometrically added in an adder Add to the composite vector signal. The digital composite signal SV' and the signal PS(90°)' are then used in a digitally operating phase discriminator PV"for phase determination. The output signal of Add is then fed—in a manner like that of FIG. 5—to the output stage AST and to a phase discriminator PV". Unlike FIG. 5, the output signal of the phase discriminator PV" is used for controlling a memory SPW in which material-specific control signal values are stored. The output signal of PV" is used, so to speak, as a control address for the corresponding memory cell in SPW, which then transmits its stored value (material factor) as control signal SS to AST to influence SV in the sense explained using FIG. 5. The material factors to be stored, so to speak, in the individual memory cells can be entered beforehand, for example, via an input apparatus EF for the different materials and possibly added to or modified later. In FIG. 11, an example for the curve of the material factor F as a function of α is reproduced in the form of an envelope curve.

In the previous exemplary embodiments, the evaluation or rather the derivation of the detection signal is an ongoing dynamic process in which the variation values are continuously read into the individual circuit stages. According to a further development of the present invention, this process can take place discontinuously, so to speak. For this purpose, in each case at the instant of the maximum value of one of the variation signals, preferably of the phase variation signal, the maximum values of both variation signals are determined and fed separately to a buffer memory SPA for AS and SPP for PS. From this buffer memory, these maximum values are then taken subsequently for the vectorial composite signal formation and used for the derivation of the further signals, such as the phase signal, control signal and detection signal. In this manner, a particularly precise time relation is obtained between the passing of a part to be sensed through the coil system and the delivery of the detection signal.

Figure 12:
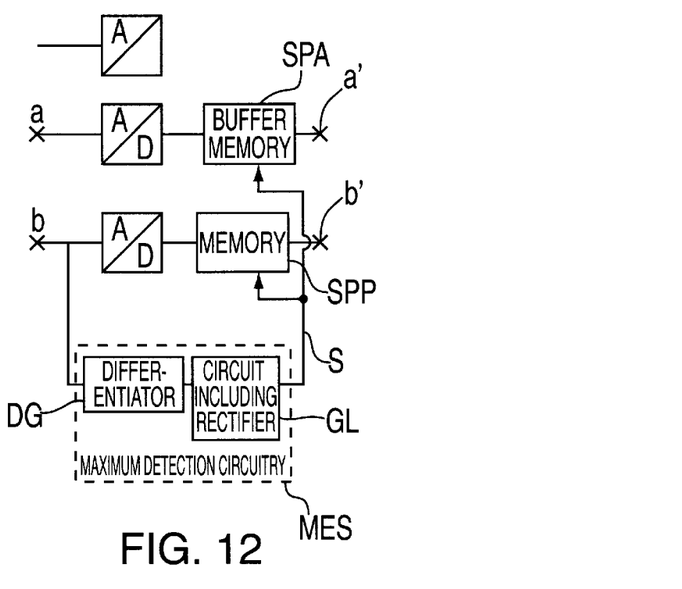
FIG. 12 shows further exemplary embodiment in which the signal evaluation takes place only at certain instants.

FIG. 12 shows an exemplary embodiment for such a circuit. Like the one according to FIG. 10, this circuit operates on a digital basis. The variation signal PS is evaluated via a maximum detection stage MES to the effect that a triggering signal S is emitted at the instant of the respective maximum value of PS. The evaluation of PS is recommended since PS is largely independent of the material quantity of the material to be detected. The triggering signal S causes through an activation of the read-in circuits of the memories SPA and SSP the maximum value of AS and PS to be written in. After the values are written in, the two memories are electrically isolated from the A/D converters for the time of the further processing of AS and PS. The written-in values of AS and PS are read out during the isolation time interval for further processing from SPA or rather SPS in a conventional manner. The entire circuit part according to FIG. 12 is to be inserted into FIG. 10 between the places indicated with a, a', b and b'. The values of AS and PS read out from SPA and SPP are, following insertion of the 90° phase shift, fed to the adder Add in which they are geometrically added in accordance with the explanations for FIG. 10 to the vectorial composite signal SV.

The detection of the maximum is possible relatively simply in that after the occurrence of a variation signal whose curve slope initially increases steadily starting from the value zero, returns to zero in the maximum of the variation signal and subsequently assumes negative values. The zero passage from positive to negative values occurring in this process, or rather the polarity reversal of the curve slope is then the criterion. The curve slope can be easily derived from the phase variation signal through differentiation in an electric differentiating element DG and the polarity reversal can be sensed without difficulties using a circuit GL containing a rectifier whose emitted signal can be used, possibly following amplification, as the triggering signal S. A resetting signal can be derived from ES, for example.

In the block diagrams according to FIGS. 10 and 12, for the sake of clarity, the other lines required for digital circuits and memories, such as the clock signal line, read-in and read-out lines and so on, and also the circuits required for such purposes, have been omitted since this circuit expenditure is generally conventional. The circuit technology of SPW is described in, for example, DE 36 28 219 A1.

OVERVIEW OF REFERENCE SIGNS

Add -->Adder for vectorial addition
AL -->Connection line
AS -->Amplitude variation signal
AST -->Output stage for emitting the detection signal ES
AT -->Circuit for deriving a detection signal
AZ -->Amplitude branch
B -->Conveyor belt
C1,C2 -->Capacitors
BT -->Actuation stage for protective devices or the like
DG -->Differentiator
ES -->Detection signal
EV -->Setting apparatus for the memory SPW
G -->Alternating current generator
GL -->Circuit containing rectifier for signal generation
MES -->Maximum detection circuit for generating the signal S
OP -->Differential amplifier or rather operational amplifier
OT -->Upper part of a device for detecting parts
PA -->Display instrument for the phase
PS -->Phase variation signal
PV -->Phase discriminator
PV' -->Phase discriminator
PV" -->Phase discriminator
PU -->Phase reversal stage
PZ -->Phase branch
S -->Read-in activation signal for the memories SPA and SPP
S1 -->Transmitting coil for generating an electromagnetic field
S2,S3 -->Receiving coils for the electromagnetic field
SG -->Rectifier stage in the amplitude branch AZ
SL -->Output line
SPA -->Buffer memory for AS
SSP -->Buffer memory for PS
SSP -->Control signal
SU -->Vectorial summer
SV -->Vectorial composite signal
SWS -->Threshold circuit with upper and lower switching threshold
SPW -->Memory for material factors
U1,U2 -->Signals tapped off the coils S2 or rather S3
Uemp -->Received signal at the output of the differential amplifier OP
Use -->Signal of the generator G
UT -->Lower part of a device for detecting parts
VG -->Adjustable delay element for delay compensation
α -->Phase angle between PS and SV
α' -->Phase angle between AS and SV

I claim:

1. A device for generating a detection signal upon occurrence of metallically conductive parts in an at least substantially non-conductive conveyor stream in which device an electromagnetic alternating field is established by an alternating current generator via a transmitting coil system in a section of the conveyor stream to be monitored, the amplitude and phase variations of the alternating field triggered when a part passes being detected by a receiving coil system and a subsequent evaluation circuit in the form of a phase variation signal and an amplitude variation signal, which are used to derive a material-specific detection signal, characterized in that a stage for vectorial addition of the phase variation signal and the amplitude variation signal is provided, that a phase comparator is provided to which on the one hand the vectorial composite signal is fed and on the other hand one of the two variation signals is fed and whose output signal (phase angle signal) corresponds to the phase angle between the vectorial composite signal and one of the two variation signals, that an evaluation stage for the phase angle signal is connected to the phase comparator which evaluation stage derives from this a control signal evaluated in a material-specific manner, and that an adjustable output stage is connected to the stage for vectorial addition, which output stage receives the control signal as an adjustment signal and whose output signal serves as a material-specific detection signal for a part to be detected which is located in the conveyor stream.

2. The device according to claim 1, characterized in that the evaluation stage is designed such that it changes the control signal inversely in comparison to the material to be detected in the amplitude ranges of the phase signal associated with other materials.

3. The device according to claim 2, characterized in that the evaluation stage is designed such that for a material to be detected, the control signal leaves the amplitude value of the output signal largely unchanged, whereas the amplitude value of the output signal is decreased for other materials.

4. The device according to one of the claims 1 to 3, characterized in that the evaluation stage is a threshold circuit that changes the control signal inversely in comparison to the material to be detected in the amplitude ranges of the phase signal associated with other materials.

5. The device according to one of the claims 1 to 3, characterized in that the evaluation circuit is an amplitude comparator having a comparison voltage that is preferably selectable in amplitude.

6. The device according to one of the preceding claims, characterized in that the output stage is designed as a multiplier that receives the vectorial composite signal as a multiplicand and the control signal as a multiplier.

7. The device according to one of the preceding claims, characterized in that in each case an analog/digital converter is connected to the evaluation circuit for the derivation of both variation signals, which convert the variation signals into digital form, and that the stage for vectorial addition and the phase comparator are designed as circuits that operate digitally.

8. The device according to claim 7, characterized in that the evaluation stage is also designed as a circuit that operates digitally.

9. The device according to claim 8, characterized in that the evaluation stage is a memory for the storage of control signal values (material factors) for specified materials, a read-out signal derived from the material-specific phase signal being provided for its read-out.

10. The device according to one of the claim 9, characterized in that an input apparatus is associated with the memory for storing control signal values for specified materials in its memory cells.

11. The device according to one of the preceding claims, characterized in that additionally an actuation stage emitting an actuation signal is provided, which actuation stage receives as an input signal the vectorial composite signal changed by the control signal, and that the actuation stage contains a threshold circuit having a preferably adjustable threshold that is designed such that at the output of the actuation stage an actuation signal is emitted only when the threshold is exceeded by the changed vectorial composite signal.

* * * * *

UNITED STATES PATENT AND TRADEMARK OFFICE
CERTIFICATE OF CORRECTION

PATENT NO. : 5,929,634
DATED : July 27, 1999
INVENTOR(S) : Manfred ARTINGER

It is certified that error appears in the above-identified patent and that said Letters Patent is hereby corrected as shown below:

Column 3, lines 54-56, delete "The invention is explained hereafter in greater detail based on exemplary embodiments represented in a drawing . The following are shown:";

Column 4, line 13, after "shows" insert --a--;

Column 4, line 14, after "shows" insert --a--;

Column 4, line 15, after "shows" insert --a--;

Column 5, line 47, after "to" insert --form--;

Column 6, line 54, after "to" insert --form--;

Column 7, line 43, after "to" insert --form--.

Signed and Sealed this

Eighteenth Day of July, 2000

Attest:

Q. TODD DICKINSON

Attesting Officer

Director of Patents and Trademarks